(12) United States Patent
Waehner et al.

(10) Patent No.: US 7,136,513 B2
(45) Date of Patent: Nov. 14, 2006

(54) SECURITY IDENTIFICATION SYSTEM

(75) Inventors: Glenn Waehner, Clovis, CA (US);
Erik Henry Tews, Fresno, CA (US);
David L. A. Toste, Fresno, CA (US);
Shane Compton, Fresno, CA (US);
Joshua Cockrum, Fresno, CA (US);
Sam Grigorian, Fresno, CA (US);
Matthew Larson, Clovis, CA (US);
John Pretzer, Fresno, CA (US);
Joshua Houser, Fresno, CA (US);
James Arbuckle, Fresno, CA (US);
William S. Arbuckle, Fresno, CA (US);
David McDonald, Prather, CA (US)

(73) Assignee: Pelco, Clovis, CA (US)

( * ) Notice: Subject to any disclaimer, the term of this patent is extended or adjusted under 35 U.S.C. 154(b) by 812 days.

(21) Appl. No.: 10/281,014

(22) Filed: Oct. 25, 2002

(65) Prior Publication Data
US 2003/0142853 A1 Jul. 31, 2003

Related U.S. Application Data

(60) Provisional application No. 60/354,180, filed on Feb. 4, 2002, provisional application No. 60/338,180, filed on Nov. 8, 2001.

(51) Int. Cl.
G06K 9/00 (2006.01)
(52) U.S. Cl. .................. 382/118; 382/209; 382/218; 382/260
(58) Field of Classification Search ................ 382/115, 382/118, 181, 209, 218, 224, 260; 340/5.53, 340/5.83, 521, 573.1; 713/182, 186

See application file for complete search history.

(56) References Cited

U.S. PATENT DOCUMENTS

| 3,690,233 | A | * | 9/1972 | Billingsley ................ 396/180 |
| 3,805,238 | A | | 4/1974 | Rothfjell |
| 4,458,266 | A | | 7/1984 | Mahoney |
| 4,814,869 | A | | 3/1989 | Oliver, Jr. |
| 4,821,118 | A | * | 4/1989 | Lafreniere ................ 348/156 |
| 4,858,000 | A | | 8/1989 | Lu |
| 4,975,969 | A | | 12/1990 | Tal |
| 5,001,755 | A | | 3/1991 | Skret |
| D325,212 | S | | 4/1992 | Elberbaum |

(Continued)

OTHER PUBLICATIONS

DX9000 Plus Digital Security Screening System Brochure Nov. 2001 (6 pgs).

Primary Examiner—Daniel Miriam
(74) Attorney, Agent, or Firm—Gunster, Yoakley & Stewart, P.A.

(57) ABSTRACT

This is a security and identification system designed to obtain improved images for use by real-time facial recognition and identification systems for screening individuals passing through secure entry or checkpoints such as airport passenger terminals, government offices, and other secure locations. The system detects the presence of a subject at the checkpoint, interactively instructs the subject to stop and move into position for proper identification and recognition, analyzes the facial features of the subject as (s)he passes through the checkpoint, and compares the features of the subject with those in a database. The system then generates different signals depending upon whether or not the subject is recognized. In one aspect of the invention, different methods and apparatus are provided for compensating for low ambient light so as to improve the quality of the facial image of the subject that is obtained.

19 Claims, 6 Drawing Sheets

U.S. PATENT DOCUMENTS

| | | |
|---|---|---|
| 5,111,288 A | 5/1992 | Blackshear |
| 5,161,107 A | 11/1992 | Mayeaux et al. |
| 5,163,094 A | 11/1992 | Prokoski et al. |
| D349,714 S | 8/1994 | Hasegawa |
| 5,517,236 A | 5/1996 | Sergeant et al. |
| 5,625,410 A | 4/1997 | Washino et al. |
| 5,657,076 A | 8/1997 | Tapp |
| D388,450 S | 12/1997 | Hamano et al. |
| 5,805,279 A * | 9/1998 | Palombo et al. ......... 356/239.4 |
| 5,808,670 A | 9/1998 | Oyashiki et al. |
| 5,905,807 A | 5/1999 | Kado et al. |
| 5,923,364 A | 7/1999 | Rhodes et al. |
| 5,936,610 A | 8/1999 | Endo |
| D415,509 S | 10/1999 | Hiraguchi |
| 5,991,429 A * | 11/1999 | Coffin et al. ................ 382/118 |
| 6,069,653 A | 5/2000 | Hudson |
| 6,069,655 A | 5/2000 | Seeley et al. |
| 6,091,771 A | 7/2000 | Seeley et al. |
| 6,108,035 A | 8/2000 | Parker et al. |
| 6,108,437 A * | 8/2000 | Lin ........................... 382/118 |
| 6,111,517 A | 8/2000 | Atick et al. |
| 6,119,096 A | 9/2000 | Mann et al. |
| 6,130,707 A | 10/2000 | Koller et al. |
| 6,292,575 B1 | 9/2001 | Bortolussi et al. |
| 6,305,818 B1 * | 10/2001 | Lebens et al. .............. 362/184 |
| 6,354,749 B1 | 3/2002 | Pfaffenberger, II |
| 6,525,663 B1 * | 2/2003 | Colmenarez et al. .... 340/573.1 |
| 6,801,640 B1 * | 10/2004 | Okubo et al. ............... 382/118 |
| 6,810,135 B1 * | 10/2004 | Berenz et al. .............. 382/118 |
| 6,882,741 B1 * | 4/2005 | Dobashi et al. ............. 382/118 |

* cited by examiner

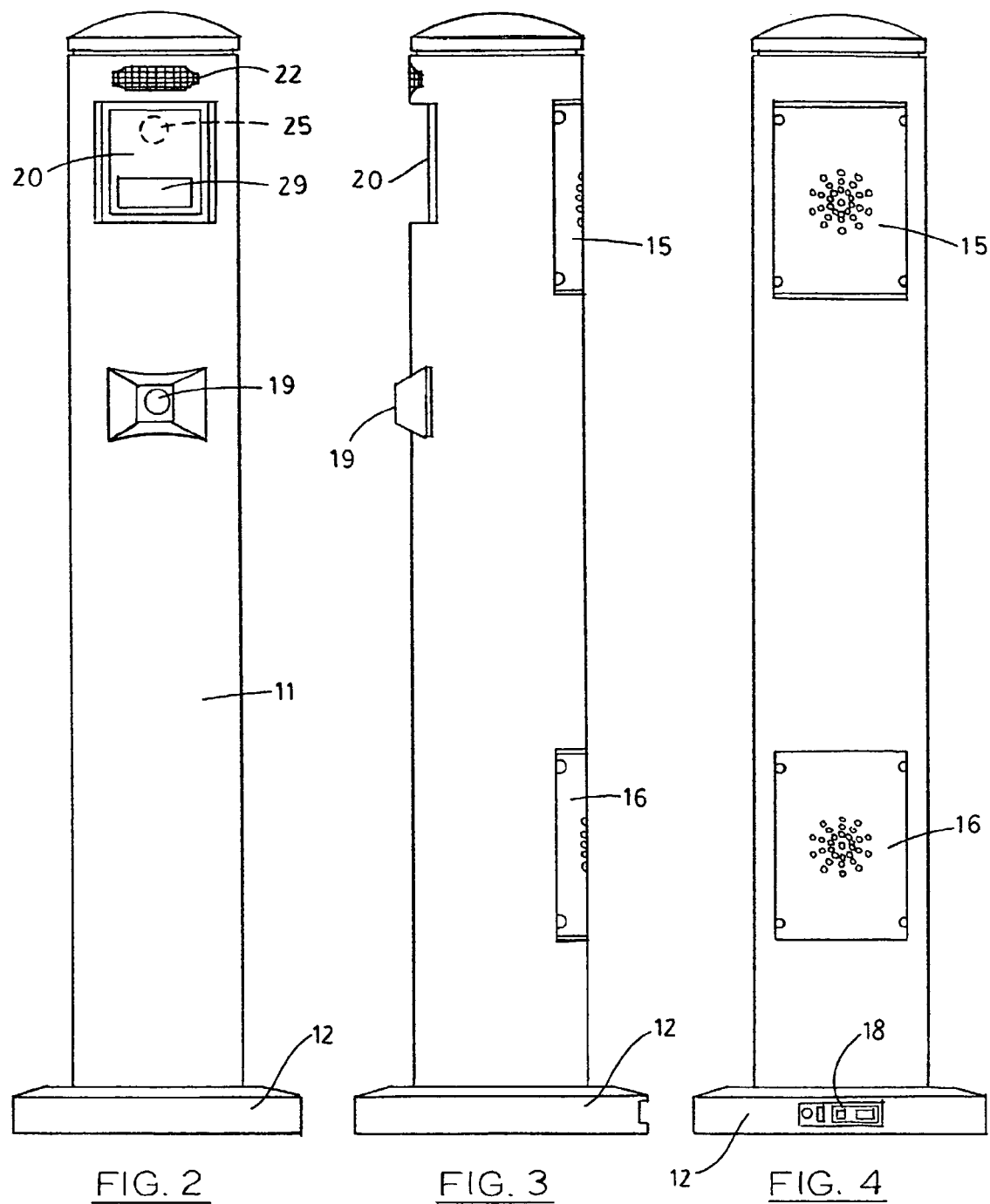

SECURITY IDENTIFICATION SYSTEM

This application claims the benefit of U.S. Provisional Application No. 60/338,180 filed Nov. 8, 2001; and U.S. Provisional Application No. 60/354,139 filed Feb. 4, 2002.

BACKGROUND OF THE INVENTION

1. Field of the Invention

The present invention relates to checkpoint security, and more particularly to an improved security and identification method and system for improving image quality in a facial recognition system for use in screening and/or identifying individuals passing through secure entry or checkpoints such as airport passenger terminals, government offices, office buildings, military facilities, laboratories, and other secure locations. It will be understood that the system and method disclosed herein can be used in improving image quality in other camera systems as well.

2. Description of the Prior Art

Recent national and international events have underscored the need for effective identification and screening of individuals entering or passing through secure checkpoints. Manual identification of persons at a checkpoint is a slow and cumbersome process, and because it is not precise, manual identification may allow unwanted or undesirable individuals to avoid detection through disguises. As a result, a number of closed-circuit television (CCTV) real-time facial recognition systems have been developed. These systems employ a computer software system that captures video images from a CCTV camera and compares the subject's facial features to those of the many subjects (e.g., terrorists or known felons) already stored in a computer database. In order for a system to function properly, it is important that the system receive a clear video image of the subject's face without heavy shadows or overexposed areas that may hide critical facial features and thereby make it difficult for the system to accurately recognize faces. It is therefore important that each subject passing through a secure checkpoint be briefly stopped and face or be directed to face in a particular direction for an optimal facial read. Because the nature of these systems is such that they may be installed in areas where lighting levels can change significantly (i.e. sunlight vs. clouds, day vs. night lighting, etc.), it is desirable to configure the camera to be less sensitive to external ambient lighting changes. To overcome the limitations of the prior art problems set forth above, such as the problem of assuring that the subject faces in an optimum direction and the problems attendant to variable ambient lighting conditions, the present invention discloses both apparatus and methods to accomplish these purposes.

Existing facial recognition or identification methods include: U.S. Pat. No. 3,805,238, which describes a primitive method for identifying individuals using selected characteristic body curves; U.S. Pat. No. 4,858,000, which describes an image recognition system designed for use in recognizing predetermined individuals out of a viewing audience; U.S. Pat. No. 5,163,094, which describes a method for identifying individuals by the analysis of elemental shapes derived from biosensor data, generating a thermal image of the individual's face that is converted to a digital representation; U.S. Pat. No. 5,905,807, which describes an apparatus for processing a facial image and creating an output of extracted data of feature points that may be used for comparison or other purposes; U.S. Pat. No. 6,111,517, which describes a continuous video monitoring system for regulating access to a restricted environment such as a computer system; and U.S. Pat. No. 6,292,575, which describes a real-time facial recognition and verification system for comparison to a stored image. Each of these patents describes either a method or apparatus for performing facial recognition or identification. However, all of these patents suffer from the drawback that unless the facial image is properly positioned and lighted for a sufficient length of time, the recognition or identification may be incomplete, inaccurate or may not take place at all.

U.S. Pat. No. 6,119,096 describes system using cameras deployed at a turnstile that scan the iris of a user for recognition. The system has sensors which detect the height of the subject, may instruct the subject to wait until scanning is completed before giving an instruction to proceed. U.S. Pat. No. 5,991,429 describes a facial recognition system for overt and covert use in which the camera angle may be adjusted to obtain a better image. However, neither of these patents discloses interactively instructing the subject for proper positioning, nor do they disclose any way to compensate for inadequate lighting.

The invention of U.S. Pat. No. 4,975,969 describes a method and apparatus for identifying individuals and encoding data onto security cards, and a related security system that uses the cards. In order to initialize a security card, the user inserts a blank card into a slot and the user's facial features are recorded in this "picture position" to establish a proper profile. The card reader at a security checkpoint is similarly placed so that the user automatically assumes the picture position at the checkpoint by inserting the card in the reader. If the cameras at the checkpoint do not get a good facial read, the user may be prompted to either reinsert the card or to push a button, causing the user to assume the picture position. It is apparent that this system requires and relies upon properly initialized security cards, and is not suitable for identification of subjects from the general population, such as at an airport check-in. The interactive instructions are only useful in such a pre-identification card-based system, and there is no disclosure of any way to compensate for inadequate lighting.

All of the above-described facial recognition systems suffer from common drawbacks that may prevent a complete or accurate identification/recognition of an individual subject passing through the checkpoint. A quickly moving individual may not remain in the field of view of the camera for a time period of sufficient length to enable proper facial scanning. As a result, an individual who is traveling quickly past the camera may not be recognized. Similarly, an individual may also escape recognition by the above-described system if the individual places a hand, arm, or other object in front of his or her face while passing by the camera. In addition, if there is inadequate ambient lighting in the vicinity of the checkpoint, even a high-resolution low light-sensitive camera may not be able to obtain a sufficiently clear image to perform complete or accurate identification and/or recognition.

SUMMARY OF THE INVENTION

The present invention overcomes the above-described drawbacks by providing an interactive real-time facial recognition system which detects the presence of a subject at the checkpoint, interactively instructs the subject to stop and move into position for proper identification/recognition, analyzes the facial features of the subject as (s)he passes through the checkpoint, and compares the features of the subject with those of known individuals whose features have been placed in a database. In one aspect of the invention, different methods and apparatus are provided for compensating for low ambient light so as to improve the quality of the facial image of the subject that is obtained.

The interactive system of the present invention includes at least one video camera. One or more such cameras may be provided at the security checkpoint, and may be mounted on posts that are associated with each secure entry lane (e.g., a lane of pedestrian traffic exiting a metal detector at an airport). The angle of the camera or cameras may be adjusted in order to obtain the best view of the facial characteristics of individuals passing through the checkpoint. The camera and/or additional cameras may also be deployed in fixtures attached to ceilings, walls, posts or other locations in the near vicinity of the checkpoint to obtain other angles for viewing subjects passing through the checkpoint. While any suitable cameras may be used, advanced, high-resolution, low-light capable digital cameras are preferred.

The present system also includes a position-sensing device that is capable of detecting the presence of an individual within the proximity of the checkpoint and camera(s). Any suitable motion or position sensing device may be employed including without limitation, one or more ultrasonic sensors, one or more laser sensors, one or more optical sensors, a pressure sensitive rug, or the like.

The system of the present invention also includes an interactive mechanism which provides instructions to the individual. This interactive mechanism may be an audio signal (voice, tone or alarm), one or more light signals, illuminated signs containing either words or symbols (e.g. the words "walk"/"don't walk," or the image of a hand/the image of a pedestrian walking), video signals or instructions provided on a video screen, a closable gate, or any combination of these or other similar devices. In particular, when the presence of an individual is sensed by the position sensing device, a signal is transmitted by the interactive mechanism instructing the individual to stop in order to be recognized. In an audio system, for example, a command such as "stop" or "step forward" may be given. In an alternative embodiment, a sign may be illuminated displaying these same words or other words to the same effect, which transmission may or may not be accompanied by a symbol and/or tone. Alternatively, a gate may close, stopping the individual. In each instance, once the presence of the individual is detected, the system interactively instructs the individual to stop moving.

In some cases, it may be necessary for the individual to move closer to the camera, or to look in a certain direction (up, down, right, or left) in order for the camera to properly scan the facial features. In such cases, an appropriate command (e.g. an audible "look up" or "look right") may be given. This same message may also be conveyed using signs, video instructions, or the like, depending upon the particular system used.

Once the subject is stopped and properly positioned, it is possible for the camera(s) to perform a complete and accurate scan of the facial features of the individual in order to then perform the step of comparing those features with the database. Proper positioning of the subject is accomplished using the software in the system that is capable of detecting that there is a face in front of the camera(s). Once the proximity sensor detects the presence of a subject, interactive commands can be given to the subject until the positioning of the subject's face is accomplished. At some point, the software will recognize that there is a face in front of the camera(s), meaning that proper positioning has been accomplished. Then, the camera(s) will generally take a number of pictures (many more than just one) to be used in the comparison process. The steps of scanning and comparing the facial features can be performed in a matter of seconds, after which an appropriate follow up command is given. In most cases, an audio command such as "thank you" or "proceed" may be given. Pictures may continue to be taken until the subject has left the viewing range of the camera(s).

In some cases, the subject may be discharged once an initial set of pictures is taken in order to keep the line of subjects moving, even if the comparison step has not yet been completed. As above, pictures may continue to be taken as the subject leaves. In these cases, if a positive comparison is then made, it will generally occur within moments of the discharge of the subject, which is still in plenty of time to alert the checkpoint attendants to take appropriate action. This slight delay may often prove to be advantageous in that the subject will not be provoked into an unpredictable reaction while in front of the cameras, and may be less guarded as (s)he leaves the area. In addition, by waiting until the subject has moved away from other subjects, (s)he may be more easily separated and detained.

In alternative systems, a green light (with or without a symbol and/or tone), a video instruction on a screen, or a raised gate may be used to convey the discharge message. When a positive comparison is made, and appropriate signal (either a recognition or warning signal, which may or may not be audible) is produced allowing security personnel to quickly respond. For example, when a match occurs, the view station could automatically display the captured, live picture next to the reference picture from the database. In addition, the screen may be programmed to flash an attention-grabbing notice along with an associated text field. The text can be customized with information such as the person's name, nationality, and physical description. The text could also be used to provide appropriate specific response instructions. The system can simultaneously alert security or law enforcement personnel around the facility or around the country so that appropriate response measures may be taken. All activity around the screening area may be recorded and users can quickly access views of the area before, during, and after occurrence of the alarm event. Remote users can also switch to a live view to assess activity in real time.

In most cases, the database will contain images of unwanted individuals, and a recognition will result in an alarm signal of some kind to alert security personnel that an unwanted individual is attempting to pass a secure checkpoint. However, the database may be established such that it contains only images of authorized personnel, in which case a recognition is required in order to pass the checkpoint. In this case, the absence of a recognition will result in an alarm signal.

In an alternative embodiment, a video screen showing the real time view of camera may be provided such that individuals passing the checkpoint are able to view themselves on the screen as they go by. Characters, images or other signals may be displayed on the screen giving instructions for individual to follow (such as "stop," "move forward" and the like, as above). These instructions may replace the video, be overlaid on top of it, or used in conjunction with audio commands.

In one aspect of the invention, a system and method is provided for improved image quality for the facial recognition system in situations where there is poor ambient lighting. A system of the invention is used in connection with an image capturing sub system, a computer sub system and specialized software which performs the face match process. An exemplary image capturing sub system comprises a camera and a light source. An exemplary computer sub system comprises a micro controller as is known in the art. Exemplary software is of the type which performs the functions for facial recognition as further described herein.

A typical installation of the invention may not allow lighting to be distributed around the subject such as is done in a photographer's studio. As such, a more compact light source may be mounted near the camera lens and is configured to fill in large dark areas on the subject's face. However, the light source can also produce specular reflections (glare) from the subject's eyes, eyeglasses, and in some instances, shiny skin. Such glare causes errors in the face match process performed by the specialized software. In one exemplary embodiment this problem is overcome by positioning a polarizing sheet in front of the light source and positioning a corresponding polarizing filter in front of the camera lens and orienting the two relative to one another to block the specular reflections, which are thereby polarized by the polarization sheet and filter arrangement. A normal diffuse image is permitted to pass through the combination of polarized sheet and filter to create a clearer image.

In accordance with the invention, it is also desirable to provide a system which is less sensitive to room ambient lighting and more dependent on auxiliary lighting provided by the system. An exemplary embodiment employs the use of a solid state LED light source as a source of illumination of the subject. Different embodiments may alternatively use strobe, xenon or other suitable pulsed light sources. The light source is pulsed in such a way that it produces very bright illumination for a short period of time and is dimly lit or completely off for the majority of the field cycle time of the camera. Further, the triggering of the light source is synchronized to the opening and closing of the camera's shutter. LEDs are well suited for this application because they are efficient, long lived, and turn on and off much faster than incandescent or fluorescent lamps.

The system of the invention further provides a method of improving the image by synchronizing the shutter opening of the camera with the power line phase. It has been discovered that incandescent and fluorescent lights show brightness variations that are caused by the electrical power driving the lamps. It has been found that if the camera is synchronized with the power line and phased so that the shutter is only open when the room lights are at a minimum brightness point, i.e. the zero voltage level of the 60 Hz power line, the camera will further reject the ambient sources of light which lead to poor image quality. The glare reduction behavior of polarized light can be used in general CCTV applications such as with domes, pan/tilts, and general surveillance cameras, to see through car windows and in similar glare sensitive applications. Other LED colors and other non visible light wavelengths, such as infrared for covert or nighttime viewing can also be used with the above concepts.

The system of the present invention is designed to be installed in security screening areas where individuals are also asked to pass through metal detection equipment under the supervision of security personnel. In one embodiment, the basic system includes a tall, large-diameter post which houses a camera, preferably an advanced, high-resolution, low-light capable digital video camera. In one embodiment, the post is approximately 6 feet high, approximately 10-inches in diameter, and made of heavy gauge, high-grade metal. In addition to housing the camera, the post may also house at least one proximity sensor, as well as visual and/or audio signal indicators (e.g. lights and/or speakers) to control traffic flow past the post. One post is provided for every entry lane, and a single local system having multiple posts may be provided for a multiple-lane checkpoint. Video from the camera of each post is connected to a system processor for analysis and recording, and may also be connected to remote viewing terminals via modem or network connection. Camera angles are carefully controlled, and may be interactively adjusted and optimized to provide the best possible video for analysis and facial recognition.

There is no interconnection between the recognition system of the present invention and any the metal detection or X-ray equipment that may also be deployed at the checkpoint. At an airport, the metal detector lane provides a simple means for confining the subject to a certain space to allow the camera(s) to capture facial images. The system may alternatively be deployed as part of, ahead of, or following the metal detection and X-ray lane. When deployed ahead of the metal detection lane, subjects are stopped, instructed for positioning, and scanned by the system immediately following the showing of their boarding pass and identification to an attendant. This deployment allows the facial scanning process to take place before the subject begins the process of emptying pockets and placing carry-on items on the X-ray conveyor. Such processes tend to distract the subject and may cause the subject to look toward his or her personal belongings instead of the camera.

Placing the system at a location behind the metal detection and X-ray lane provides a second, separate checkpoint where the facial scanning can take place. A separate funneling lane is necessary for this configuration, but this positioning also has the logistical advantage of avoiding the distraction of the subject that may be caused by the process of depositing and retrieving personal items from the X-ray conveyor. It is also advantageous in that if a recognition is made it is easier to separate the recognized subject from other subjects.

In addition to its detection and recognition capability, the present invention also provides full-motion digital video recording for all of the lane cameras, and may record video images from additional cameras deployed in the area. This video is preferably stored on digital hard drives which allow for instant review of any camera at the press of an on-screen button at the view station without interrupting simultaneous recording of images from the checkpoint. User programmable macros allow the system to be set up for quick reviews that are needed often. For example, a press of a button could allow the operator to review the last 30 seconds of activity in front of the screening area. Storage capacity can be scaled to requirements, providing weeks of continuous recording where any segment can be retrieved and viewed in seconds.

The system of the present invention also allows for remote viewing of live or recorded video anywhere over a wide or local area network or modem connection. In accordance with this aspect of the invention, a central dispatch location (or locations) can be automatically notified when an identification is made, and supervisors there can oversee operations at all security checkpoints. In addition, remote users can have access to recorded video. Operations by multiple remote users do not affect each other such that two different users may access the same or different recorded video at the same time without interfering with each other. Access to servers is secured.

All system administration tasks such as photo database management can be centralized. Individual systems may be updated over the network so that data continuity is assured. This could be accomplished over a wide area network under government control, or by local control inside the facility over a local area network. Other system parameters such as recognition sensitivity may also be adjustable from a central location.

It is therefore a primary object of the present invention to provide an automated system including methods and apparatus for improving image quality in facial recognition systems deployed at security checkpoints.

It is also a primary object of the present invention to provide an automated interactive system for detecting, stopping and instructing a subject at a security checkpoint to move into position so that facial identification and recognition may be performed on the subject.

It is also a primary object of the present invention to provide methods and apparatus for overcoming lighting problems encountered in facial identification and recognition systems deployed at security checkpoints having poor ambient lighting.

It is also an important object of the present invention to provide an automated method and apparatus for detecting the presence of a subject at a security checkpoint, interactively instructing the subject to first stop, and then, if necessary, instructing the subject to turn or move in a given direction so that an optimal view of the subject's facial characteristics may be obtained for performing facial identification and recognition on the subject.

It is also an important object of the present invention to provide an automated apparatus for use with a facial identification and recognition system at a security checkpoint to improve image quality that includes a proximity sensor for detecting the presence of a subject in the area of the checkpoint, at least one adjustable camera for obtaining a video image of the subject's facial characteristics, and an interactive system for giving appropriate instructions to the subject such as "stop," "move forward," "look up," and the like.

It is also an important object of the present invention to provide an apparatus for use with a facial identification and recognition system at a security checkpoint to improve image quality that includes at least one camera and one light producing source, a first polarizing filter associated with the light producing source, and a complementary polarizing filter associated with the camera, said filters being used to avoid specular reflections from the eyes, glasses and/or skin of the subject during facial identification and recognition.

It is also an important object of the present invention to provide an apparatus for use with a facial identification and recognition system at a security checkpoint to improve image quality that includes at least one camera and one light producing source in which the light producing source provides a brief pulse of light at given time intervals that coincide with the opening of the shutter of the camera.

It is also an important object of the present invention to provide an apparatus for use with a facial identification and recognition system at a security checkpoint to improve image quality that includes at least one camera that is synchronized with the power line and phased so that the camera shutter is only open when the room lights are at a minimum brightness point so as to reject ambient sources of light that lead to poor image quality.

It is also an important object of the present invention to provide an apparatus for use in connection with a facial identification and recognition system at a security checkpoint that includes at least one tall, large-diameter post at each lane of the checkpoint for housing a proximity sensor, a camera, and interactive signal indicators (lights and/or speakers) for giving instructions to a subject entering the lane.

It is also an important object of the present invention to provide an apparatus for use in connection with a facial identification and recognition system at a security checkpoint that includes a plurality of cameras deployed on walls, ceilings, posts or other structures to provide various angles for facial recognition.

It is also an important object of the present invention to provide an apparatus for use in connection with a facial identification and recognition system at a security checkpoint that is capable of simultaneously recording, displaying and transmitting video from the system to local and remote locations.

Additional objects of the invention will be apparent from the detailed descriptions and the claims herein.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 is a front elevational view of a self-contained unit of the present invention in the form of a vertical post which includes a camera, illuminated signs, audio signal, and ultrasonic proximity sensor.

FIG. 3 is a side view of the embodiment of FIG. 2.

FIG. 4 is a back view of the embodiment of FIG. 2.

DETAILED DESCRIPTION OF A PREFERRED EMBODIMENT

Figure 1:
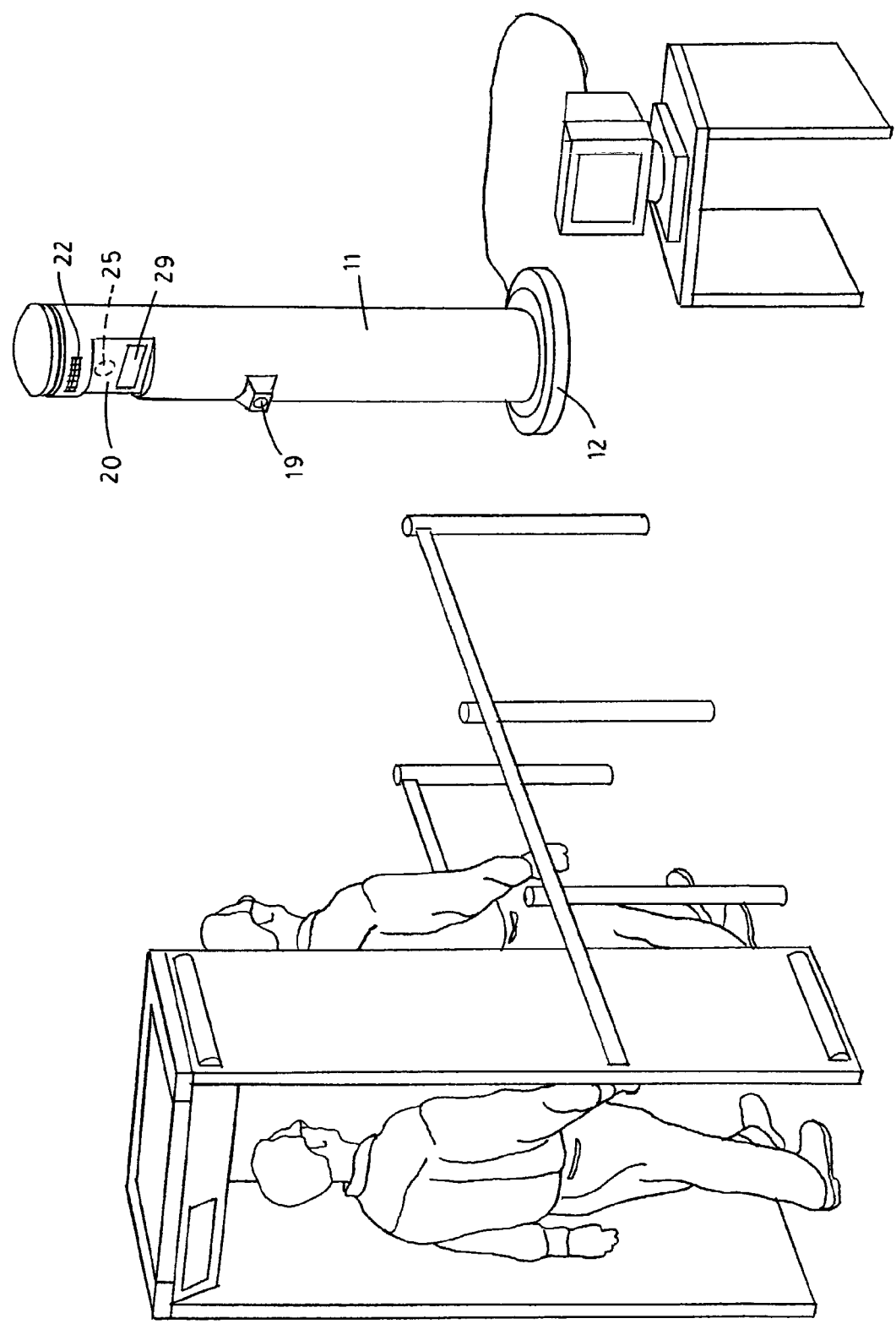
FIG. 1 is an environmental view of the present invention in use in conjunction with an airport metal detector lane.
Figure 5:
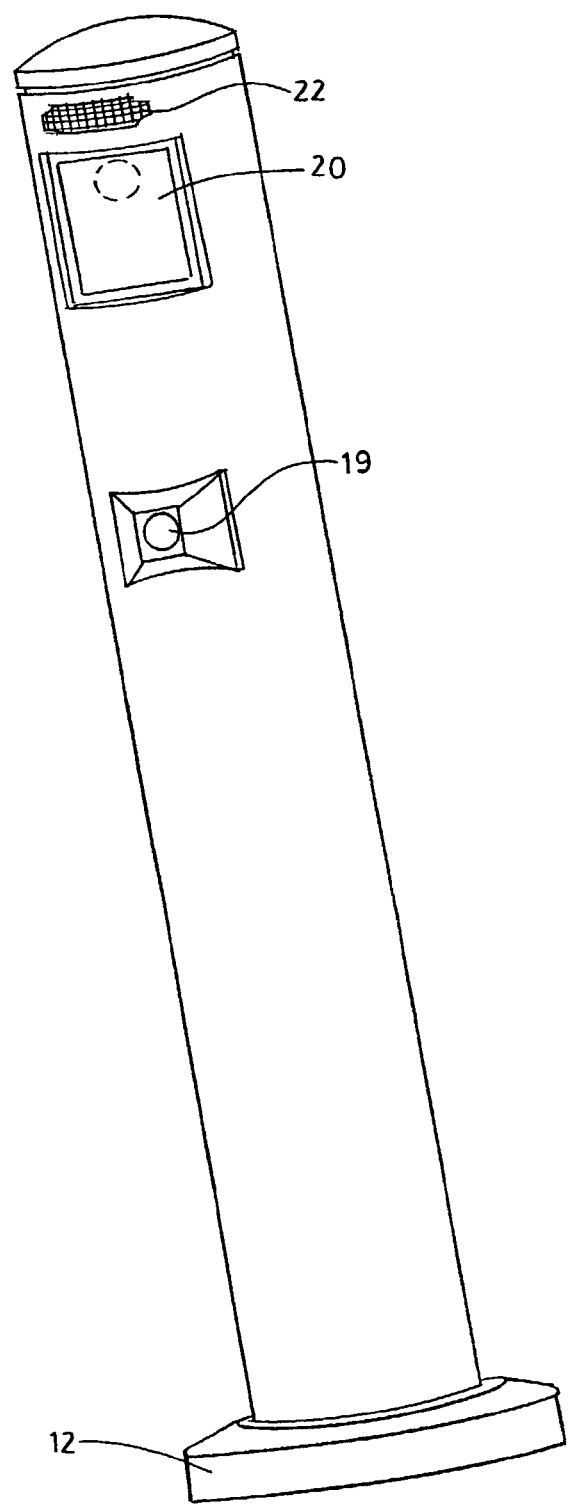
FIG. 5 is a slightly offset perspective front view of the embodiment of FIG. 2.
Figure 6:
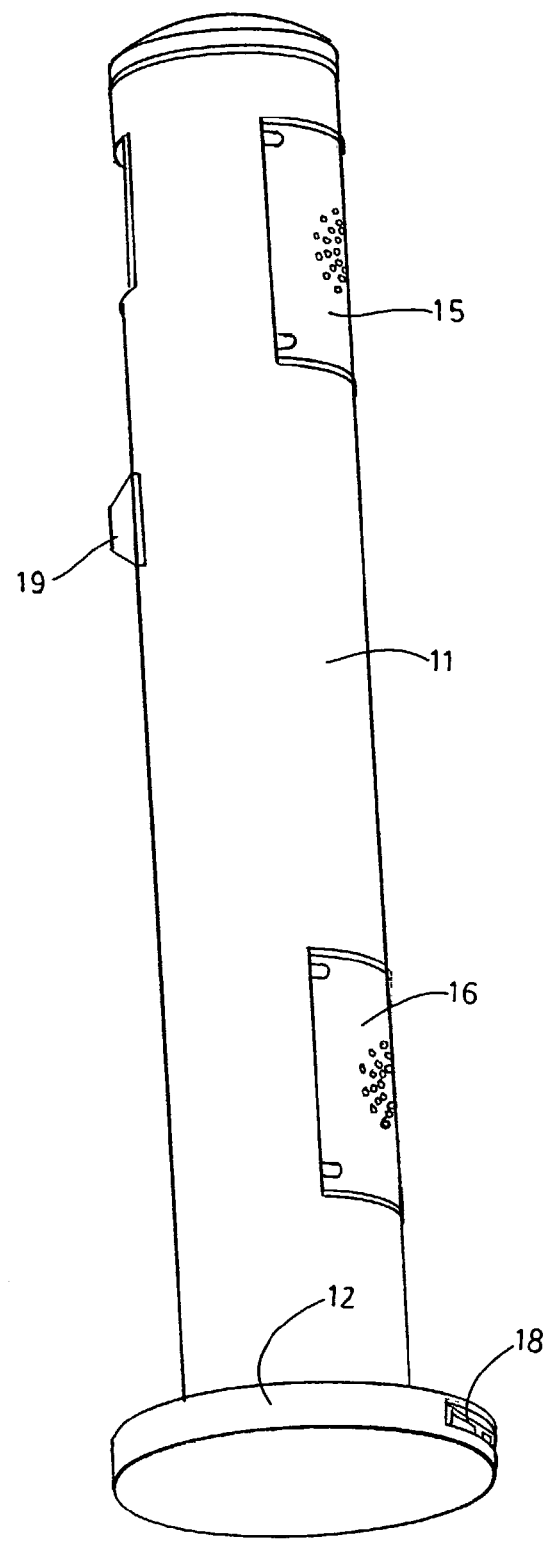
FIG. 6 is another slightly offset perspective rear view of the embodiment of FIG. 2.

Referring to the drawings wherein like reference characters designate like or corresponding parts throughout the several views, and referring particularly to FIGS. 1, 2, and 3, it is seen that the invention includes a large diameter vertical post 11 having a support base 12. A window 20 is provided on the front of post 11 behind which a video camera 25 is deployed, preferably a high-resolution, low-light capable digital camera. Camera 25 should be selected such that is it capable of reading the facial features of individuals from as far away as 25 feet, to as close as 1 foot.

Window 20 also includes at least two illuminatable signs 29 which display the different messages such as "stop" and "go," as well as any other additional or alternative messages such as "look up," "step forward," "step back," "proceed," etc. It is to be appreciated that instead of displaying words in window 20, visual symbols may be used to provide instructions (e.g., the universal "do not enter" symbol of a circle with a single slash "/" across it; the illuminated hand symbol indicating "don't walk" from a pedestrian crosswalk; or any appropriate or newly-developed instructional symbol). At least one audio speaker 21 behind sound holes 22 is provided for giving verbal instructions, tones or warning alarms as the case may be. The audible signals from speaker 21 may be provided in addition to or instead of the visual display at window 20.

A proximity or movement sensor 19 is provided on post 11 below window 20. Sensor 19 may be of any suitable form including ultrasonic, laser, optical, or the like. Alternatively, sensor 19 may be in the form of a pressure sensitive mat in the lane adjacent to post 11. Sensor 19 detects motion in the near proximity of post 11 activating one of the interactive instructional messages such as "stop." Sensor 19 continuously monitors the movements of the individual, and may trigger an alarm if the subject exits the area prematurely, or does not stop after being instructed to do so. Once the proximity of a subject is detected and the subject is stopped, camera 25 communicates the image of the subject to the recognition program. The program is capable of determining whether or not the image it receives is a "face." If this determination is not made, it means that the subject is not facing the camera properly. In response, one or more interactive instructions may be displayed at window 20 and/or audibly given to the subject through speaker 21 such as "step forward," "look up" or "look left." Instructions of this sort may be given until the subject's face is in proper position for scanning. Once the subject is in proper position (a "face" is recognized), one or more video images are taken of the facial characteristics of the subject and provided to the comparison program which performs the identification/recognition function. If the individual is cleared to continue, the window and speakers instruct the individual to "proceed," and sensor 19 continues to monitor the individual's movements until (s)he is out of range.

If the subject is matched to an unwanted or undesirable person in the system database, an appropriate alarm or other signal is generated. This may be in the form of a silent or audible alarm given to the local security operators, and may or may not include additional information. For example, when a match occurs, the view station could automatically display the captured, live picture next to the reference picture from the database. In addition, the screen may be programmed to flash an attention-grabbing notice along with an associated text field. The text can be customized with information such as the person's name, nationality, and physical description. The text could also be used to provide appropriate specific response instructions.

Ventilated access panels 15 and 16 are provided on the rear of post 11 to allow entry to the interior of the post to access the camera 25, change light bulbs, and otherwise maintain and/or repair the electronics inside. A set of jacks 18 for such things as telephone, power, video and/or computer are provided at the rear of base 12.

Figure 7:
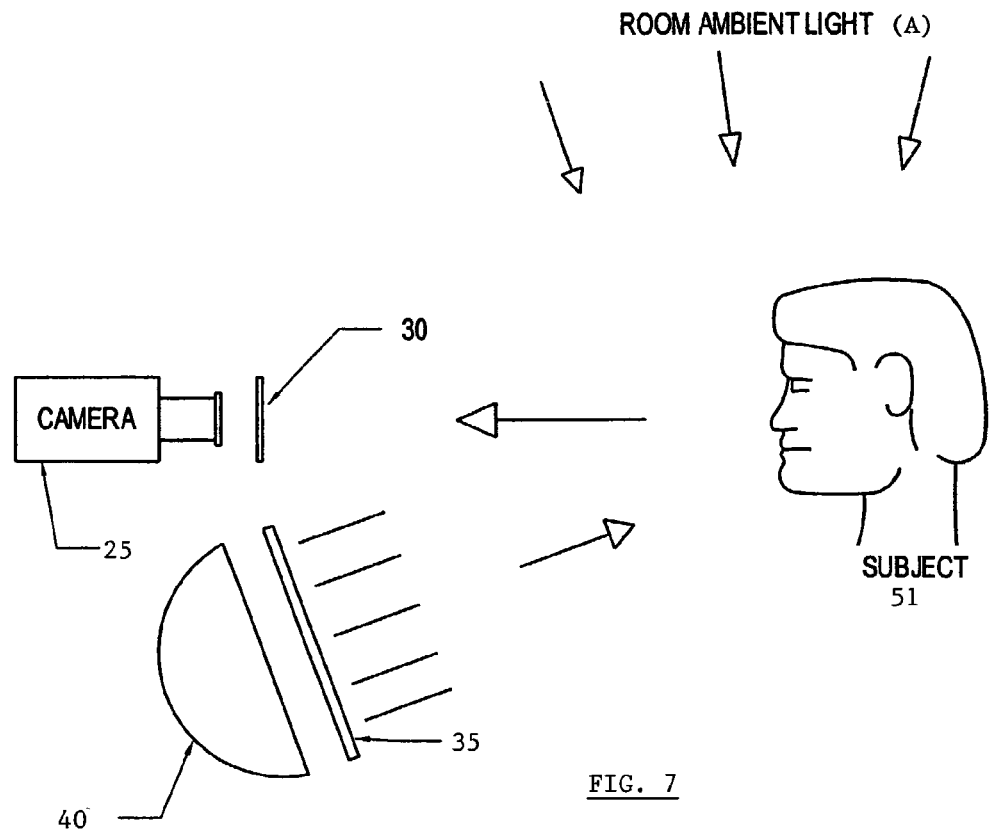
FIG. 7 is a perspective view of a light filtering system constructed in accordance with the principles of the present invention.

Referring now to the alternative embodiment illustrated in FIG. 7, an exemplary system arrangement is shown which supports the features of the present invention. FIG. 7 shows a camera 25 directed toward a subject's face 51. Positioned adjacent the camera 25 is a light source 40. In the exemplary embodiment shown in FIG. 7, a polarizing filter 30 is shown positioned adjacent the camera lens and a polarizing sheet or film 35 is shown positioned adjacent the light source 40. The polarizing filter 30 and the polarizing sheet 35 are positioned relative to one another to limit the amount of specular reflections (eyes, eyeglasses, etc.) from the subject's face.

For example, filter 30 may be rotated relative to film 35 to stop glare but allow facial features to pass through.

Figure 8:
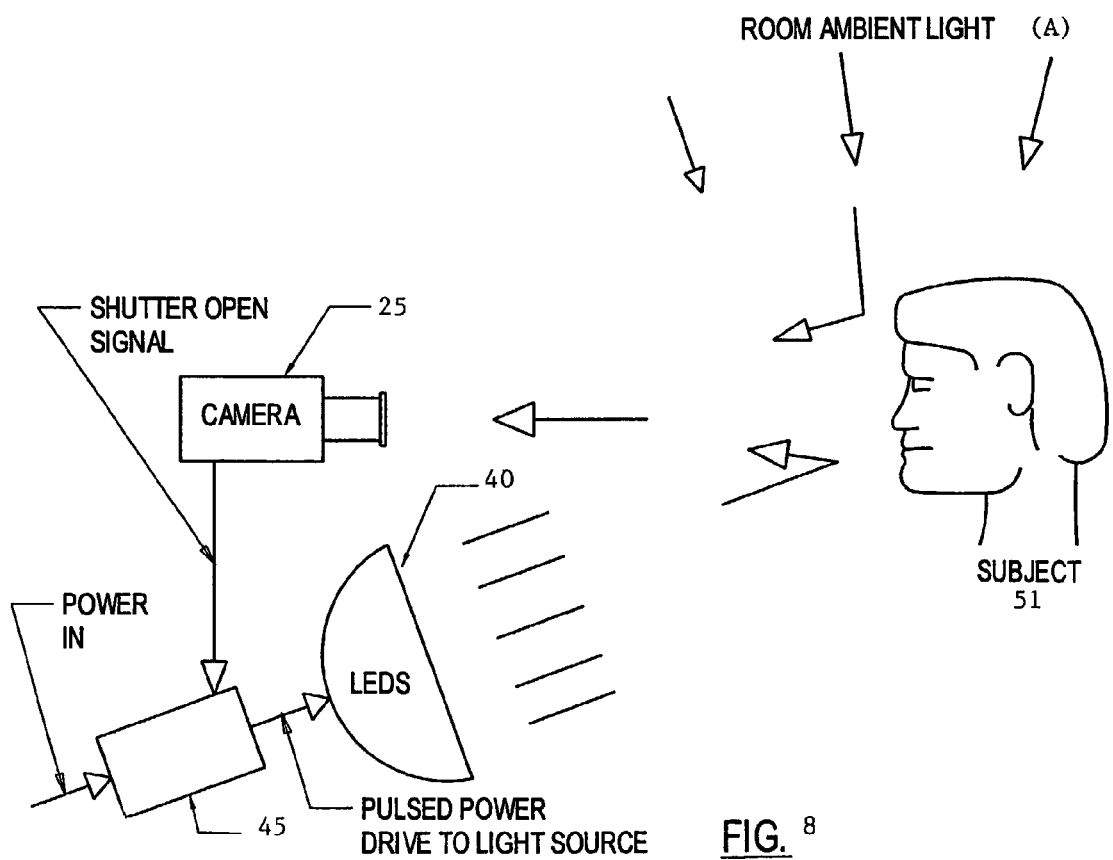
FIG. 8 is a perspective view of an alternate arrangement of a lighting system constructed in accordance with the principles of the present invention.
Figure 9:
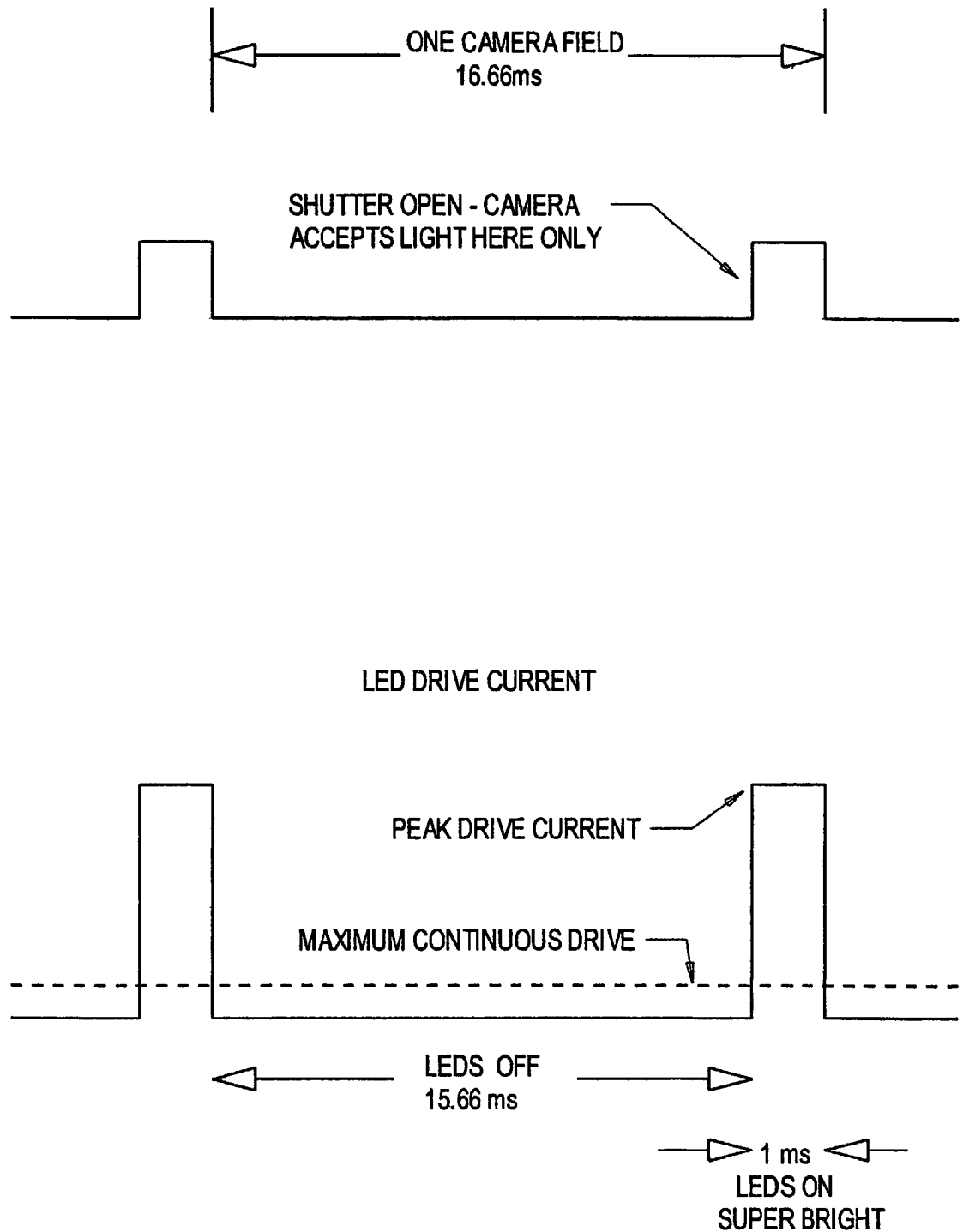
FIG. 9 is a graphic representation of light activation versus shutter opening time.

Turning to FIG. 8, another exemplary arrangement is shown. Provided is the camera 25, the light source 40 and a controller 45. In this embodiment, the light source 40 is at least one light emitting diode (LED), and the controller 45 is configured to pulse the LED light source based on a signal received from the camera 25. To accomplish the synchronization of the activation of the LED light source with the opening of the camera shutter, a signal from the camera indicating the opening of the shutter is detected by the LED controller 45 which activates the LED light source 40 in accordance with desired parameters. An exemplary illumination cycle is shown in FIG. 9, which is a graphic representation of a pulse cycle and shutter opening cycle. The LED light source is illuminated for approximately one millisecond and dimly lit or turned off for approximately 15.7 milliseconds. The camera shutter is synchronized so that it is only open during the time the LED light source is turned on. As such, the camera shutter rejects greater than about 90% of the room ambient light, but accepts virtually 100% of the LED's output.

To provide the desired light levels the LEDs are pulsed with an average drive current close to their maximum continuous rating, shown by the broken lines of FIG. 9. The result is that the drive pulses are many times the peak rating (super bright) during the periods of illumination. However, since the LEDs are only illuminated for short periods of time (e.g. about 1 out of every 16.7 milliseconds), overheating and damage to the LEDs is prevented. By this method, the LED light source 45 is actually many times brighter than the room ambient light A, but appears to be much less bright than room ambient light to the subject's eyes.

Figure 10:
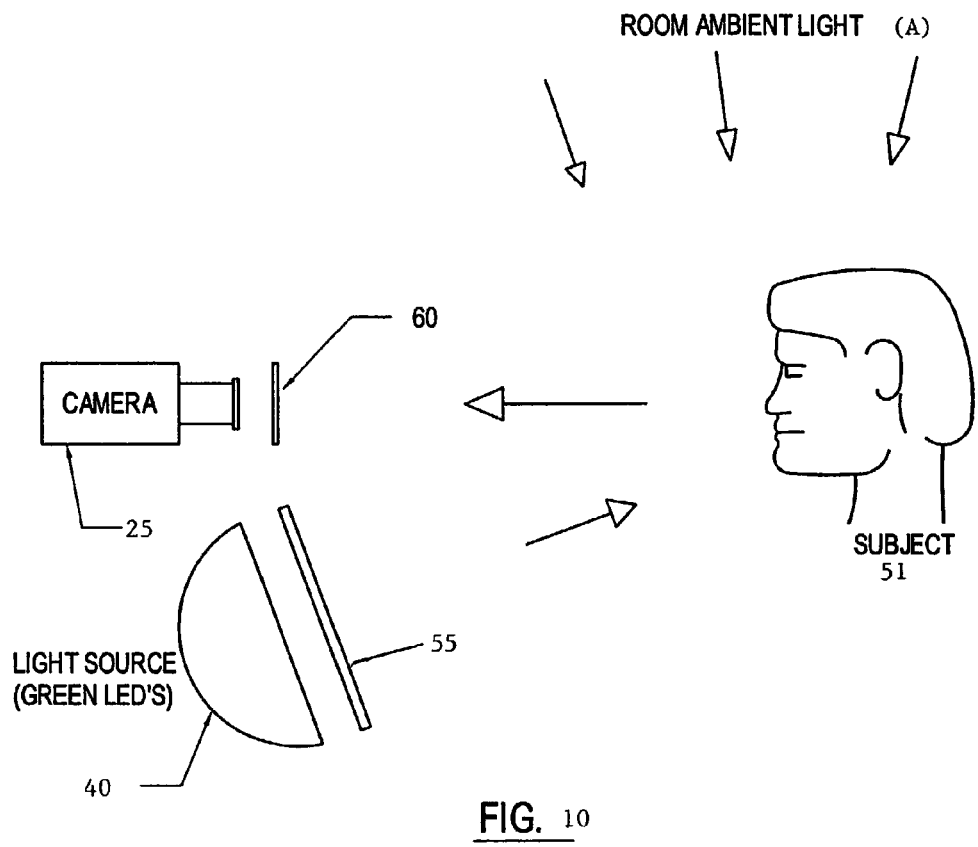
FIG. 10 is a perspective view of another alternate arrangement of a lighting system constructed in accordance with the principles of the present invention.

Yet another exemplary embodiment is shown in FIG. 10. This illustration shows a configuration of a system using green LEDs as the light source 40. A green filter 55 is used to match the LED spectrum, preferably with as narrow band as possible. An associated green filter 60 is provided in front of the camera 25. By this method almost all of the green light passes through the filter and into the camera, and much of the ambient room light A is largely rejected. This is known as spectral filtering and provides a significant improvement over conventional prior art systems. Complementary filters of different colors may alternatively be used for different video effects, the selection of which will depend upon the camera and LEDs used, and the optimal spectrum of light for the given desired performance. Additionally polarization filters may also be employed here, as previously described with reference to FIG. 7.

Figure 11:
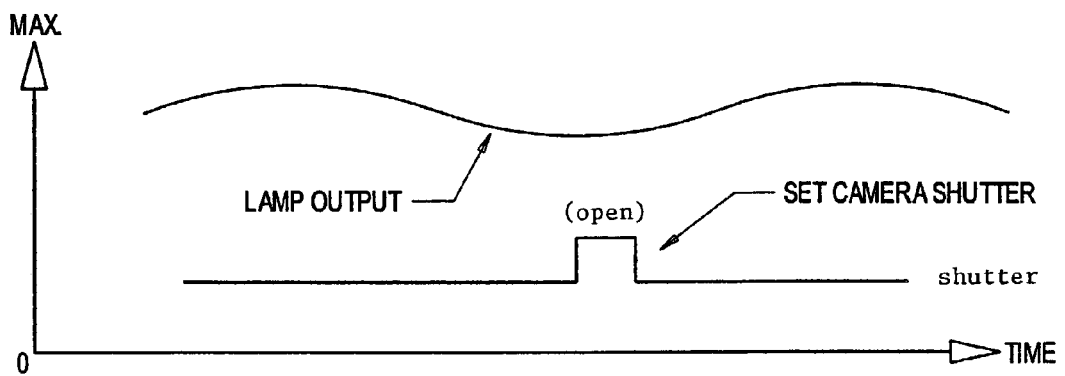
FIG. 11 is a graphic representation of shutter opening time versus power line phase.

It has also been discovered that incandescent and fluorescent lamps encounter brightness variations that are caused by the electrical power driving the lamps. It has been found that the camera will further reject the ambient sources of light A which lead to poor image quality if the camera 25 is synchronized with the power line and phased so that the shutter is only open when the room lights are at a minimum brightness point. An example of this synchronization is illustrated in FIG. 11 where the shutter is synchronized to only open at the minimum brightness point of the corresponding light source (i.e., the zero voltage level of a 60 Hz power line).

It is to be appreciated that numerous different combinations of the various components of the present system may be utilized to accomplish the desired interactive process to stop the individual long enough for facial scanning and comparison to take place. For example, a gate or restraining arm may be used to stop subjects at the checkpoint, or a video display may be used to display the various instructions (e.g., "stop," "move forward," "look left," etc.). It is also to be appreciated that the components of the system need not be included in a single unit or post, but may be disposed together or separately at various locations around the checkpoint, depending upon such things as the configuration of the checkpoint, the closeness of walls and ceilings, the space available, etc.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An automated checkpoint identification system comprising: a sensor for detecting the presence of a subject at the checkpoint; a camera for obtaining a video image of the subject; a light source for illuminating the subject; a first colored filter for controlling the spectrum of light passing therethrough positioned between said light source and the subject; a second corresponding colored filter for controlling the spectrum of light passing therethrough positioned between said camera and the subject; a facial scanning program for determining whether the face of the subject is in position for obtaining a video image thereof using said camera; a transmitter for providing instructions to the subject to move until the subject's face is in position for obtaining a video image thereof; a facial recognition program for comparing a video image of the subject obtained by said camera with images in a database for a potential match; and a signal that is activated in the event of a match.

2. The automated system of claim 1 wherein said transmitter instructs said subject to exit the checkpoint if no match is made.

3. The automated system of claim 1 wherein said transmitter provides audio instructions to said subject.

4. The automated system of claim 1 wherein said transmitter is in the form of a changeable video display.

5. The automated system of claim 1 wherein said presence sensor is selected from the group consisting of ultrasonic, laser, optical, and pressure sensitive flooring.

6. The automated system of claim 1 wherein a gate is used to stop the subject prior to facial scanning.

7. The automated system of claim 5 wherein a plurality of cameras are used to take video images of the subject.

8. The automated system of claim 1 wherein said match signal is in the form of an alarm.

9. The automated system of claim 1 wherein the video image taken of the subject is recorded.

10. The automated system of claim 9 wherein the video images taken of the subject are transmitted to a central computer for storage and processing.

11. The automated system of claim 1 wherein a first polarizing filter is placed between said light source and the subject, and a second polarizing filter is placed between said camera and the subject, said second filter being rotated so as to prevent reflected glare from passing therethrough to said camera.

12. The automated system of claim 1 wherein an auxiliary lighting source is provided for illuminating the subject, said source being capable of producing a brief pulse of bright light, said pulse being synchronized to the opening and closing of a shutter of said at least one camera.

13. The automated system of claim 12 wherein said auxiliary lighting source is selected from the group consisting of LEDs and strobes.

14. The automated system of claim 1 wherein an auxiliary lighting source is provided, and a shutter of said at least one camera is synchronized with the power to the lighting source and phased so as to only open when the lighting source is at a minimum brightness point.

15. An automated system as recited in claim 1, wherein said light source has a color and the color of said first and second filters correspond to the color of said light source.

16. An apparatus for improving the quality of video images obtained by a facial recognition system at an entry checkpoint comprising: at least one camera for obtaining a video image of the face of a subject; a facial recognition system for comparing video images taken of the face of said subject with pre-stored images in a database for a potential match; a light source for illuminating the subject; a first polarizing filter placed between said light source and the subject; and a second polarizing filter placed between each at least one camera and the subject, said second filter being rotated so as to prevent reflected glare from passing therethrough to said at least one camera.

17. An apparatus for improving the quality of video images obtained by a facial recognition system at an entry checkpoint comprising: at least one camera for obtaining a video image of the face of a subject; a facial recognition system for comparing video images taken of the face of said subject with pre-stored images in a database for a potential match; an ambient light source for illuminating the subject wherein a shutter of said at least one camera is synchronized with the power to the ambient light source and phased so as to only open when the ambient light source is at a minimum brightness point so as to reject ambient sources of light that lead to poor image quality.

18. An identification system comprising: a camera for obtaining a video image of a subject; a light source for illuminating the subject; a first colored filter for controlling the spectrum of light passing therethrough positioned between said light source and the subject; a second corresponding colored filter for controlling the spectrum of light passing therethrough positioned between said camera and the subject; a facial recognition program for comparing a video image of the subject obtained by said camera with images in a database for a potential match; and a signal that is activated in the event of a match.

19. An identification system as recited in claim 18, wherein said light source has a color and the color of said first and second filters correspond to the color of said light source.

* * * * *